United States Patent
Wakui et al.

[11] Patent Number: 5,355,461
[45] Date of Patent: Oct. 11, 1994

[54] METHOD OF AND APPARATUS FOR SELECTING AN ORIGIN ADDRESS FOR USE IN TRANSLATING A LOGICAL ADDRESS IN ONE OF A PLURALITY OF VIRTUAL ADDRESS SPACES TO A REAL ADDRESS IN A REAL ADDRESS SPACE

[75] Inventors: Fujio Wakui; Masahiko Tagami, both of Hadano, Japan

[73] Assignees: Hitachi, Ltd., Tokyo; Hitachi Computer Eng. Co., Ltd., Hadano, both of Japan

[21] Appl. No.: 587,031

[22] Filed: Sep. 24, 1990

[30] Foreign Application Priority Data

Sep. 22, 1989 [JP] Japan .................. 1-247324

[51] Int. Cl.⁵ ........................................... G06F 12/10
[52] U.S. Cl. .................. 395/400; 364/DIG. 1; 364/256.3; 364/256.4; 364/961.2
[58] Field of Search ... 364/200 MS File, 900 MS File; 395/425, 400

[56] References Cited

U.S. PATENT DOCUMENTS

| | | | |
|---|---|---|---|
| 3,761,881 | 9/1973 | Anderson et al. | 395/400 |
| 4,050,094 | 9/1977 | Bourke | 395/400 |
| 4,068,303 | 1/1978 | Morita | 395/400 |
| 4,355,355 | 10/1982 | Butwell et al. | 395/400 |
| 4,473,878 | 9/1984 | Zolnowsky et al. | 395/400 |
| 4,521,846 | 6/1985 | Scalzi et al. | 395/425 |
| 4,945,480 | 7/1990 | Clark et al. | 395/700 |
| 5,008,811 | 4/1991 | Scalzi et al. | 395/400 |
| 5,023,773 | 6/1991 | Baum et al. | 395/425 |
| 5,134,696 | 7/1992 | Brown et al. | 395/425 |
| 5,159,677 | 10/1992 | Rubsam et al. | 395/425 |

FOREIGN PATENT DOCUMENTS

| | | |
|---|---|---|
| 0041378 | 5/1985 | Japan . |
| 0041380 | 5/1985 | Japan . |
| 0041379 | 9/1985 | Japan . |

*Primary Examiner*—Joseph L. Dixon
*Assistant Examiner*—Matthew M. Kim
*Attorney, Agent, or Firm*—Antonelli, Terry, Stout & Kraus

[57] ABSTRACT

A data processing system capable of accessing multiple virtual address spaces wherein a an access register translation is performed when obtaining an origin address (STO) of a translation table to be used for address translation of a logical address into a real address. If an access register designated by an instruction has a value equal to a predetermined value, another STO stored in a control register is used instead of the STO obtained by the access register translation. Registers are provided for storing results of detection as to whether or not each of the access registers has a value equal to the predetermined value and a sector is provided selecting either the STO in the control register or the STO obtained by the access register translation based on the stored results of detection, thus eliminating a process to discriminate the values of the access registers at each access to the virtual address spaces.

8 Claims, 4 Drawing Sheets

METHOD OF AND APPARATUS FOR SELECTING AN ORIGIN ADDRESS FOR USE IN TRANSLATING A LOGICAL ADDRESS IN ONE OF A PLURALITY OF VIRTUAL ADDRESS SPACES TO A REAL ADDRESS IN A REAL ADDRESS SPACE

BACKGROUND OF THE INVENTION

1. Field of the Invention

This invention relates to a data processing system in which a program being executed can access operands in a plurality of spaces concurrently, and more particularly to a data processing system for performing access register (AR) translation when obtaining a base address (STO) (Segment Table Origin) of a translation table to be used for translation from a logical address into a real address.

2. Description of the Related Art

According to the ESA/370 (Enterprise System Architecture/370) architecture of IBM (International Business Machines) Corporation, in order to select one address space from multiple virtual address spaces, it is possible to designate a space identifier (hereinafter also called ALET (Access List Entry Token)) by an access register (hereinafter also called AR) corresponding to a base register to be used in computing an operand logical address of an instruction and also possible to obtain a base address (hereinafter also called STO) of a translation table, which is prepared in the virtual address space by a table indexing means (i.e., access register translation; hereinafter also called AR translation or ART) which is provided by the system to the ALET. This architecture also includes a memory (hereinafter called ALB (ART Look-aside Buffer) for storing translation pairs of the ALET and STO, thereby reducing the amount of time taken for the AR translation.

In the meantime,

1) The STO to be obtained is a primary STO (hereinafter called PSTO) retained in a control register No. 1 when the ALET retained in the AR corresponding to a designated base register number is '0'.
2) The STO to be obtained is a secondary STO (hereinafter called SSTO) retained in a control register No. 7 when the ALET is '1'.

This prior art system is exemplified by Japanese Patent Publication No. 60-41379(B2).

With any of the foregoing prior art systems, in the process (i.e. AR translation) for obtaining the STO from the ALET retained in the AR corresponding to the base register number, which process occurs at a time between the operand address computing and the operand data read for an instruction, the following two discriminating processes would be necessary:

(1) whether or not the ALET is '0', and
(2) whether or not the ALET is '1'.

When the ALET is neither '0' nor '1' in these two discriminating processes (1) and (2), the STO is obtained referring to the ALB in which translation pairs of ALET and STO are stored. In addition, when there is no translation pair to be obtained in the ALB, the STO is obtained by AR translation.

Consequently, overhead due to these two discriminating processes (1) and (2) would be caused by the time STO is obtained.

SUMMARY OF THE INVENTION

It is therefore an object of this invention to provide a method of accessing multiple virtual address spaces and a data processing system which enable such overhead to be reduced.

Another object of the invention is to provide a method of accessing multiple virtual address spaces and a data processing system which enable overhead of an ALB access to be reduced at every execution of an RX type instruction especially in a case where access time of the memory (ALB) in which the translation pairs of ALET and STO are stored is relatively long.

According to a first aspect of the invention, there is provided a method of accessing multiple virtual address spaces to obtain an origin address for address translation by use of general registers each adapted to be designated as a base register by an instruction, access registers corresponding to the respective general registers and a control register and by performing access register translation of the content of the access register into a space identifier when computing an operand address computing, said method comprising: detecting whether or not the space identifier of each of the access registers is equal to a predetermined value and retaining the results of detection in association with the access registers and updating the results of detection in association of the change of the contents of the access registers; and selecting either the origin address preretained in the control register or the origin address obtained by the access register translation, according to the detection result retained in association with one of the access registers, when obtaining an origin address based on the space identifier retained in the access register in association with the general register designated as a base register by an instruction.

According to a second aspect of the invention, there is provided a data processing system with multiple virtual address spaces comprising a plurality of general registers each adapted to be designated as a base register by an instruction, a plurality of access registers for retaining space identifiers in association with the general registers, an access register translating means for translating space identifiers retained in the access registers into origin addresses for address translation, and a control register for retaining a arbitrary origin address wherein the origin address stored in the control register is used for address translation when the space identifier retained in the access register corresponding to the base register designated by the instruction is equal to a predetermined value, said system further comprising: space identifier detecting means for detecting whether or not the space identifier retained in each of the access registers is equal to the predetermined value; a plurality of detection result retaining means for retaining the detection results of said space identifier detecting means in association with access registers; and origin address selecting means for selecting either the origin address obtained by the access register translating means or the origin address in the control register, in accordance with the output of one of the detection result retaining means corresponding to the base register designated by the instruction, among said plurality of detection result retaining means.

According to a third aspect of the invention, there is provided a data processing system with multiple virtual address spaces comprising a plurality of general registers each adapted to be designated as a base register by an instruction, a plurality of access registers for retaining space identifiers in association with the general registers, an access register translating means for translating space identifiers retained in the access registers into origin addresses for address translation, and first and second control registers for retaining respective arbitrary origin addresses, wherein the origin address stored in the first or second control register is used for address translation when the space identifier retained in the access register corresponding to the base register designated by the instruction is equal to either a first or a second value and wherein the base address obtained by the access register translating means is used when the space identifier retained in the access register corresponding to the base register designated by the instruction is equal to a value other than the first and second values, said system further comprising: a plurality of space identifier detecting means for detecting whether or not the space identifier retained in the respective access register is equal to the first or second value; a plurality of detection result retaining means for retaining the detection results of said space identifier detecting means in association with the access register; and origin address selecting means for selecting either the origin address in the first or second control register or the origin address obtained by the access register translating means, in accordance with the output of one of the detection result retaining means corresponding to the base register designated by the instruction, among said plurality of detection result retaining means.

According to a fourth aspect of the invention, there is provided a data processing system with multiple virtual address spaces comprising a plurality of general registers each adapted to be used as a base register by an instruction, a plurality access registers for retaining space identifiers in association with the general registers, an access register translating means for translating the space identifiers retained in the access registers into origin addresses for address translation, a translation pair memory for storing translation pairs of origin addresses as the space identifiers subjected to the translation and the results of the translation, and a control register for retaining an arbitrary origin address, said system further comprising: space identifier detecting means for detecting whether or not the space identifier retained in each of the access registers is equal to a predetermined value; a plurality of detection result retaining means for retaining the detection results of the space identifier detecting means in association with the access registers; and origin address selecting means for selecting either the origin address from the translation pair memory or the origin address in the control register, in accordance with the output of one of the detection result retaining means corresponding to the base register designated by the instruction, among said plurality of detection result retaining means.

According to a fifth aspect of the invention, there is provided a data processing system with multiple virtual address spaces comprising a plurality of general registers each adapted to be designated as a base register by an instruction, a plurality of access registers for retaining space identifiers in association with the general registers, an access register translating means for translating the space identifiers retained in the access registers into origin addresses for address translation, and a control register for retaining an arbitrary origin address, said system further comprising: space identifier detecting means for detecting whether or not the space identifier retained in each of the access register is equal to the predetermined value; a plurality of detection result retaining means for retaining the detection results of said space identifier detecting means in association with the access registers; a plurality of origin address registers provided in association with the access registers for retaining the origin addresses obtained by the access register translating mean; first selecting means for selecting one of said plurality of origin address registers according to a signal designating the base register; and second selecting means for selecting either the origin address from said first selection means or the origin address in the control register, in accordance with the output of one of the detection result retaining means corresponding to the base register designated by the instruction, among said plurality of detection result retaining means.

According to a sixth aspect of the invention, there is provided a data processing system with multiple virtual address spaces comprising a plurality of general registers and adapted to be used as a base register by an instruction, a plurality of access registers for retaining space identifiers in association with the general registers, an access register translating means for translating the space identifiers retained in the access registers into origin addresses for address translation, a translation pair memory for storing translation pairs of origin addresses as the space identifiers subjected to the translation and the results of the translation, and a control register for retaining an arbitrary origin address, said system further comprising: space identifier detecting means for detecting whether or not the space identifier retained in each of the access registers is equal to a predetermined value; a plurality of detection result retaining means for retaining the detection results of the space identifier detecting means in association with the access registers; a plurality of origin address registers provided in association with the plurality of access registers for retaining the origin addresses obtained from the translation pair memory; first selecting means for selecting one of said plurality or origin address registers according to a signal designating the base register; and second selecting means for selecting the origin address from said first selection means or the origin address in the control register, in accordance with the output of one of said detection result retaining means corresponding to the base register designated by the instruction, among said plurality of detection result retaining means.

According to a seventh aspect of the invention, there is provided a data processing system with multiple virtual address spaces comprising a plurality of general registers each adapted to be used as a base register by an instruction, a plurality of access registers for retaining space identifiers in association with the general registers, an access register translating means for translating the space identifiers retained in the access registers into origin addresses for address translation, a translation pair memory for storing translation pairs of origin addresses as the space identifiers subjected to the translation and the results or the translation, and a control register for retaining an arbitrary origin address, said system further comprising: space identifier detecting means for detecting whether or not the space identifier retained in each of the associated access registers is equal to value; a plurality of detection result retaining means for retaining the detection results of the space identifier detecting means in association with the access registers; a plurality of origin address registers provided in association with the plurality of access registers for retaining the origin addresses obtained from the translation pair memory; a plurality of valid data registers provided in association with the origin address registers for retaining data indicating the validities of the origin addresses; first selecting means for selecting said plurality of origin address registers and the associated valid data registers according to a signal designating the base register; second selecting means for selecting the origin address from said first selection means or the origin address in the control register, in accordance with the output of one of said detection result retaining means corresponding to the base register designated by the instruction, among said plurality of detection result retaining means; and validity check means for checking the validity of the origin address selected by said second selecting means, based on the data of said valid data register selected by said first selecting means and the output of said detection result retaining means.

In the method of this invention, when obtaining base address (STO) necessary for address translation of an virtual address space based on the space identifier (ALET) retained in the access register corresponding to the base number of an instruction, the base address retained in the control register or the base address to be obtained from the access register translation is selected depending on the space identifier detection results retained in association with the access registers.

A plurality of the control registers each for storing an origin address may be used, in which case the base address of any of the control registers is selected for use.

In the processing system in which access register translation is necessary for obtaining a real address from a logical address, when the value of the space identifier in each of the access registers varies from '0' to '1' and vice versa, such change of the value is detected and retained by the respective means so that the discriminating processes as to whether the ALET of the AR designated by the instruction in every operand address computing process becomes unnecessary, thus enabling high-speed address translation.

Specifically, since it is possible to utilize the result of detection of whether the space identifier is '0' or '1' by the above-mentioned means simultaneously with referring to the translation pair of the space identifier and the base address in the translation pair memory (ALB), discrimination processes on the space identifiers before referring to the ALB become unnecessary, thereby reducing the amount of time for translation, and hence improving the processing performance.

Further, by providing a plurality of the base address registers for retaining the base addresses in association with the respective access registers, data retained in the base address registers can be used without accessing the ALB while the data in the origin address registers are valid.

In accessing a virtual space in accordance with the space identifier in the access register designated by an instruction when the origin address by the access register translation is to be selected depending on the result of the detection of the space identifier associated with the access register, if the content of the valid bit register associated with the access register is valid, the origin address retained in the associated origin address register is used for address translation. If the content of the valid bit register is 'invalid', access register translation of the space identifier is performed again, and then the obtained base address is stored in the base address register while setting the associated valid bit to indicate 'valid', and subsequently the address translation is performed as mentioned above.

With this arrangement of the invention, it is possible to reduce the number of accesses to the ALB so that the processing performance can be improved particularly in the system where access time of the ALB is relatively long.

The above and other advantages, features and additional objects of this invention will be manifest to those versed in the art upon making reference to the following detailed description and the accompanying drawings in which several preferred structural embodiments incorporating the principles of this invention are shown by way of illustrative example.

DETAILED DESCRIPTION

Figure 1:
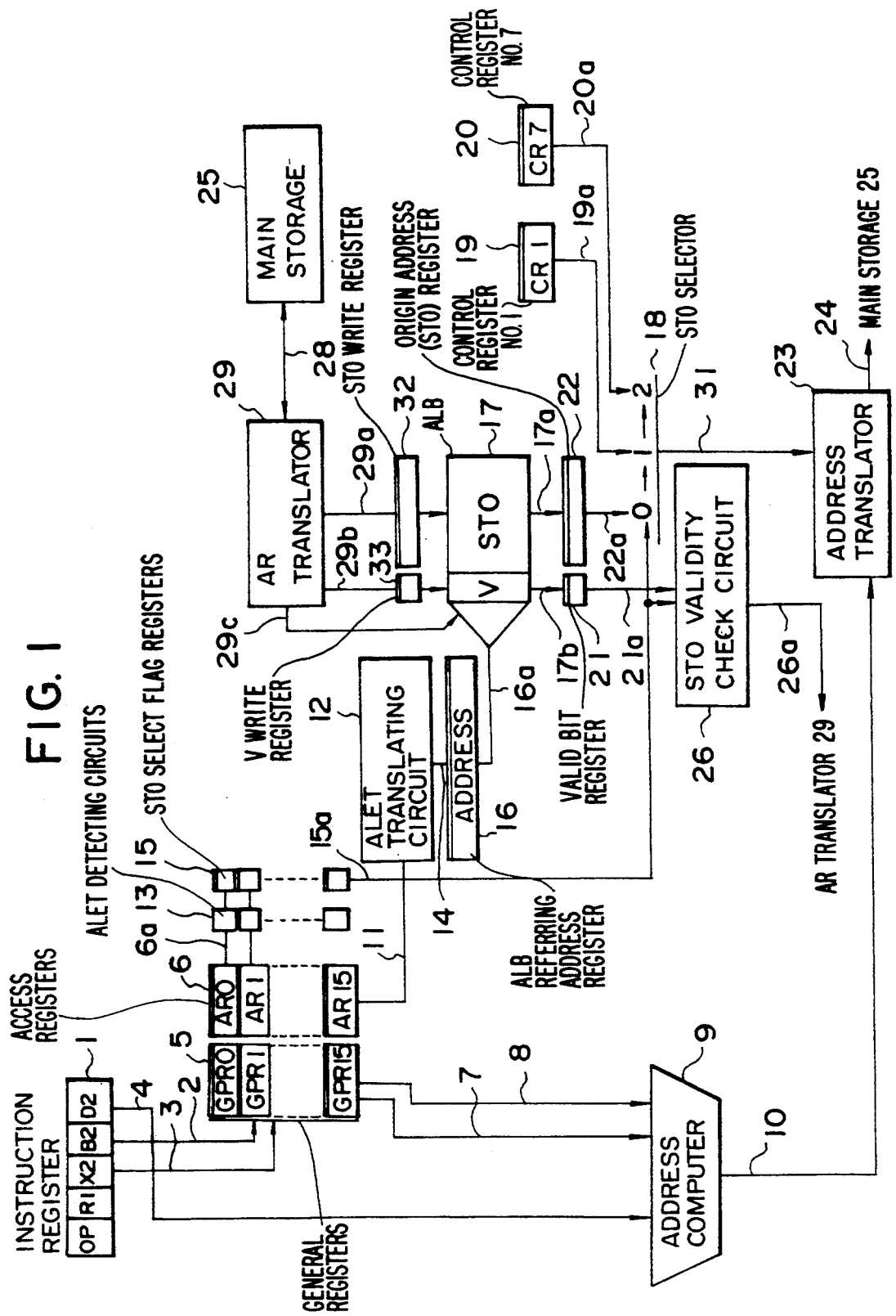
FIG. 1 is a block diagram showing a data processing system according to a first embodiment of the invention.

FIG. 1 is a block diagram of a data processing system according to one embodiment of the invention, showing necessary parts for obtaining a real address to read operand data of an instruction.

In FIG. 1, reference numeral 1 designates an instruction register; 5, a group of general registers (GPRs); 6, a group of access registers (ARs); 9, an address computer; 12, an ALET translating circuit; 13, an ALET detecting circuit; 15, an STO select flag register; 17, an ALB; 18, an STO selector; 19, a control register No. 1 (CR1); 20, a control register No. 7 (CR7); 21, a valid bit register; 22, an origin address (STO) register; 23, an address translator; 25, a main storage; 26, an STO validity check circuit; and 29, an AR translator.

An instruction read from the main storage 25 is stored in the instruction register 1 and depending on the instruction type, necessary operand data is read from a buffer storage (not shown) or the main storage 25. In this embodiment, it is assumed as one example (e.g., an 'L' instruction) that an RX type instruction is stored in the instruction register 1. The contents of the B2 field and the X2 field of the instruction in the instruction register 1 are inputted to the general registers 5 via signal lines 2 and 3, and each of the fields selects a respective general register. The contents of the selected general registers are inputted to the address computer 9 via signal lines 7 and 8. Meanwhile, the content of the D2 field of the instruction is inputted to the address computer 9 via a signal line 4.

The address computer 9 obtains, as the result of address computing, an effective logical address which will be an address inside a virtual space, and transmits the effective logical address to the address translator 23 via a signal line 10.

On the other hand, the ALET retained in one of ARs 6 corresponding to the general register selected by the B2 field of the instruction is read out, and is then transmitted to the ALET translating circuit 12 via a signal line 11.

The ALET translating circuit 12 is adapted for producing an address to refer to the ALB in which the translation pairs of the ALET and the origin address (STO) are stored. The produced address is stored in an ALB referring address register 16 via a signal line 14.

From the ALB referring address register 16, the ALB 17 is referred to via a signal line 16a. In the ALB 17, the data of the STO and the data (V) indicating whether or not tile data of STO is valid are registered. As the result of the this referring, STO is transmitted via a signal line 17a, and stored V data is transmitted via a signal line 17b. Further, the STO is stored in the STO register 22 via the signal line 17a, while the V data is stored in the valid bit register 21 via the signal line 17b.

Meanwhile, in the individual ARs, ALETs retained therein are inputted to the respective ALET detecting circuits 13 via signal lines 6a. The ALET detecting circuits 13 are prepared in association with the respective ARs in this embodiment, tile function of the circuits being shown in FIG. 2.

Figure 2:
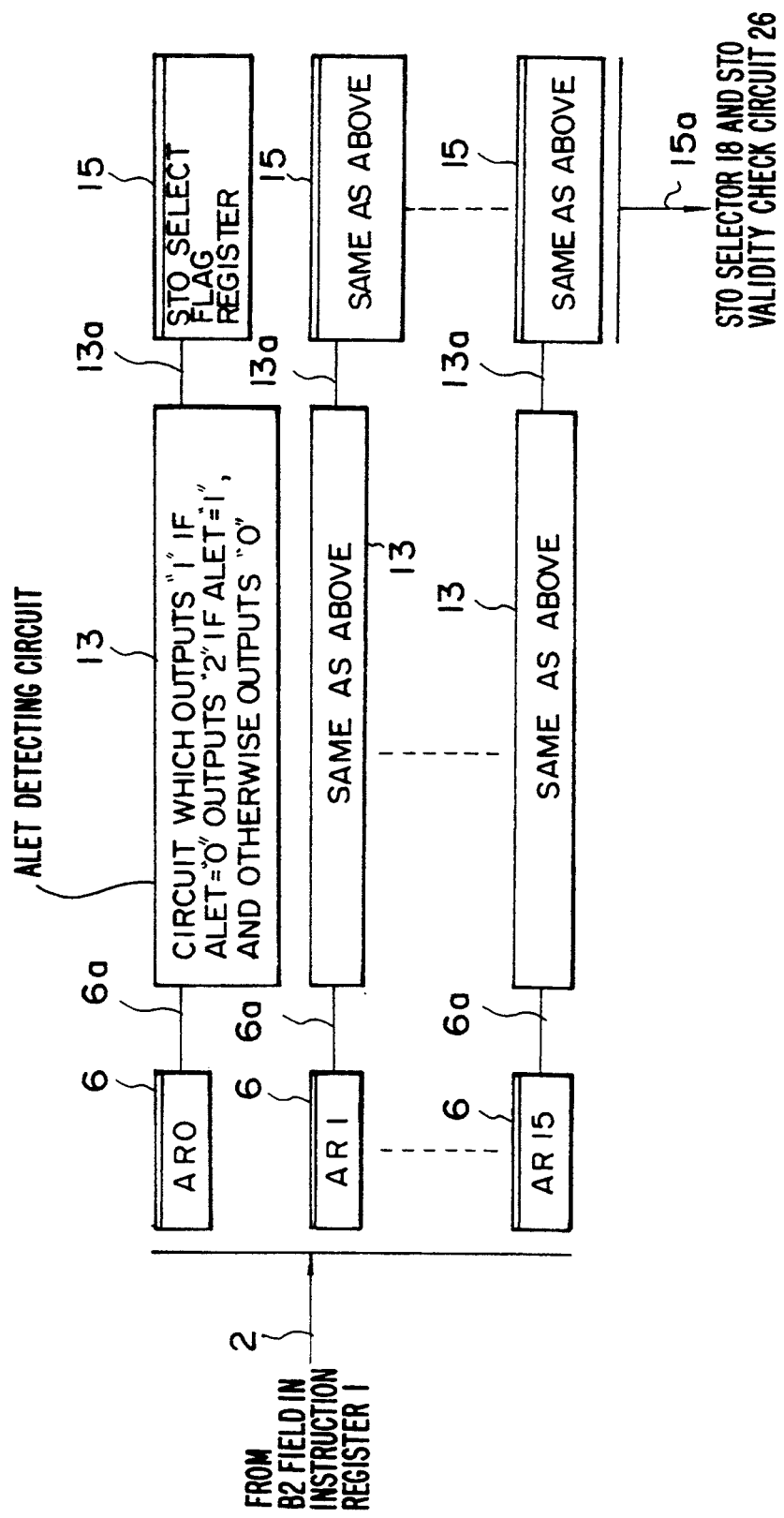
FIG. 2 is a block diagram showing the function of an ALET detecting circuit in FIG. 1.

Each ALET detecting circuit 13 of FIG. 2 outputs '1' to a signal line 13a if the inputted ALET is '0', and outputs '2' if the ALET is '1', and outputs '0' if the ALET is neither '0' nor '1'. The output values on the signal lines 13a are inputted to the STO select flag registers 15 where they are stored in association with the ALET detecting circuits 13. The detecting circuits 13 can be easily composed of a combinational logic circuit, though there is no detailed illustration in the drawings.

In this embodiment, a value is stored in the respective STO select flag register 15 based on the ALET stored in the corresponding AR register 6 at a time the ALET stored in the AR 6 has varied. Even after the ALET in the AR 6 has varied, such storing can be performed at an arbitrary time prior to obtaining the STO necessary to form the real address the ALET does not vary further. Further, although a plurality of the detecting circuits 13 are provided in association with the ARs in this embodiment, for accomplishing the original object of the invention, it is enough that a plurality of STO select flag registers 15 are provided in association with the ARs. The detecting circuits 13 may be substituted by a single detecting circuit in association with all of the ARs 6. In this case, a selector is provided before and after the single detecting circuit.

The content of one STO select flag register 15 selected by the B2 field of the instruction is inputted to the STO validity check circuit 26 via the signal line 15a.

Figure 3:
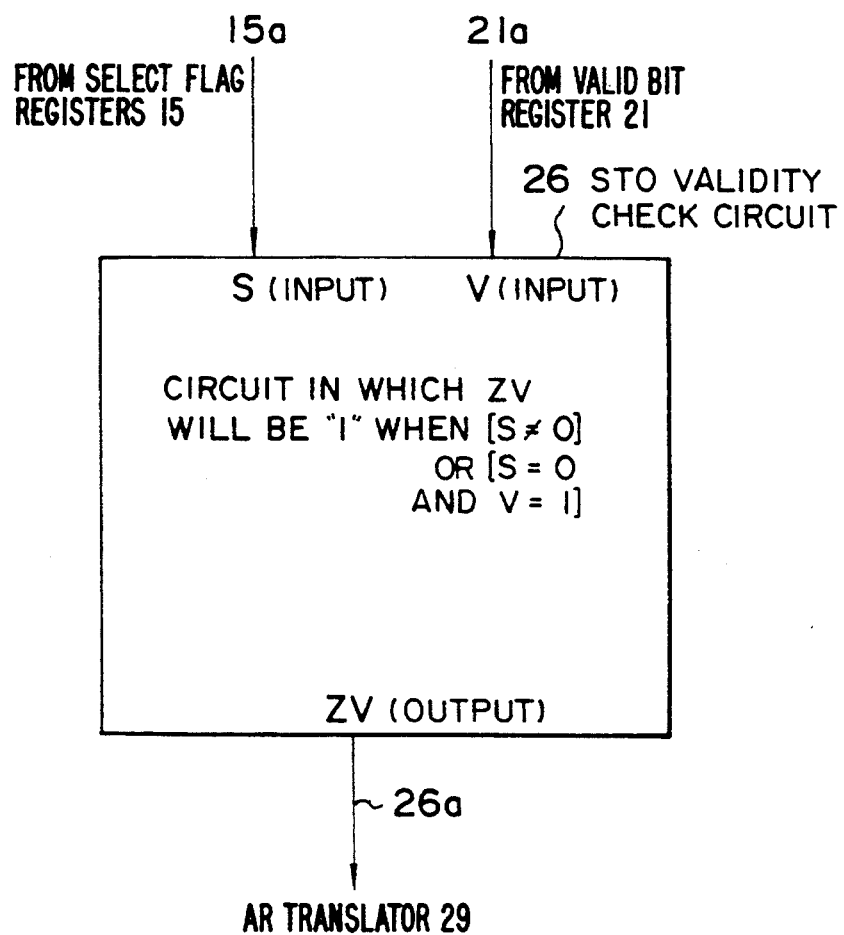
FIG. 3 is a diagram showing the function of an STO validity check circuit in FIG. 1.

Also, the output from the valid bit register 21 is inputted to the STO validity check circuit 26 via a signal line 21a, the function of the STO validity check circuit 26 being shown in FIG. 3. In FIG. 3, 'S' stands for an input from the signal line 15a, and 'V' stands for another input from the signal line 21a. The output 'ZV' of this circuit 26 will be '1' when any of the following two conditions is satisfied:
Condition 1: S≠0.
Condition 2: S=0 and V=1.

The output ZV of the circuit 26 is inputted to an AR translator 29 via the signal line 26a. This circuit 26 also can be easily composed of a combinational logic circuit.

Refering back to FIG. 1, the signal line 15a from the STO select flag register 15, along with the signal lines 22a, 19a, and 20a to which the individual STOs stored in the STO register 22, CR1 19 and CR7 20 are respectively outputted, are inputted to the STO selector 18. In this STO selector 18, the signal line 15a serves as a select control line; when the value of this signal line is '0', the signal line 22a which carries the STO from ALB 17 is selected. When the value is '1', the signal line 19a which carries the STO from CR1 is selected. Similarly, when the value is '2', the signal line 20a which carries the STO from CR7 is selected.

The result of the selection is inputted to the address translator 23 via a signal line 31.

When the output signal 26a from the STO validity check circuit 26 is '0', this information is transmitted to the AR translator 29 to start AR translation. The AR translator 29 obtains an STO from the main storage 25 via a signal line 28. The obtained STO is stored in an STO write register 32 via a signal line 29a. Further, data '1' is set via a signal line 29b in a V write register 33 indicating that the content of the STO write register 32 is valid. Upon completion of storing in the individual write registers 32, 33, a write signal is applied to the ALB 17 via a signal line 29c, so that the contents of the write registers are stored in ALB 17.

As a result, the signal line 17b will be '1', and the STO stored in ALB 17 is outputted to the signal line 17a and is subsequently inputted to the logical address translator 23 via the STO selector 18. Using the inputted effective logical address and STO, the logical address translator 23 produces a real address and transmits the real address to a signal line 24. This real address is transmitted to the buffer storage or the main storage 25 via the signal line 24 for use in reading an operand.

Figure 4:
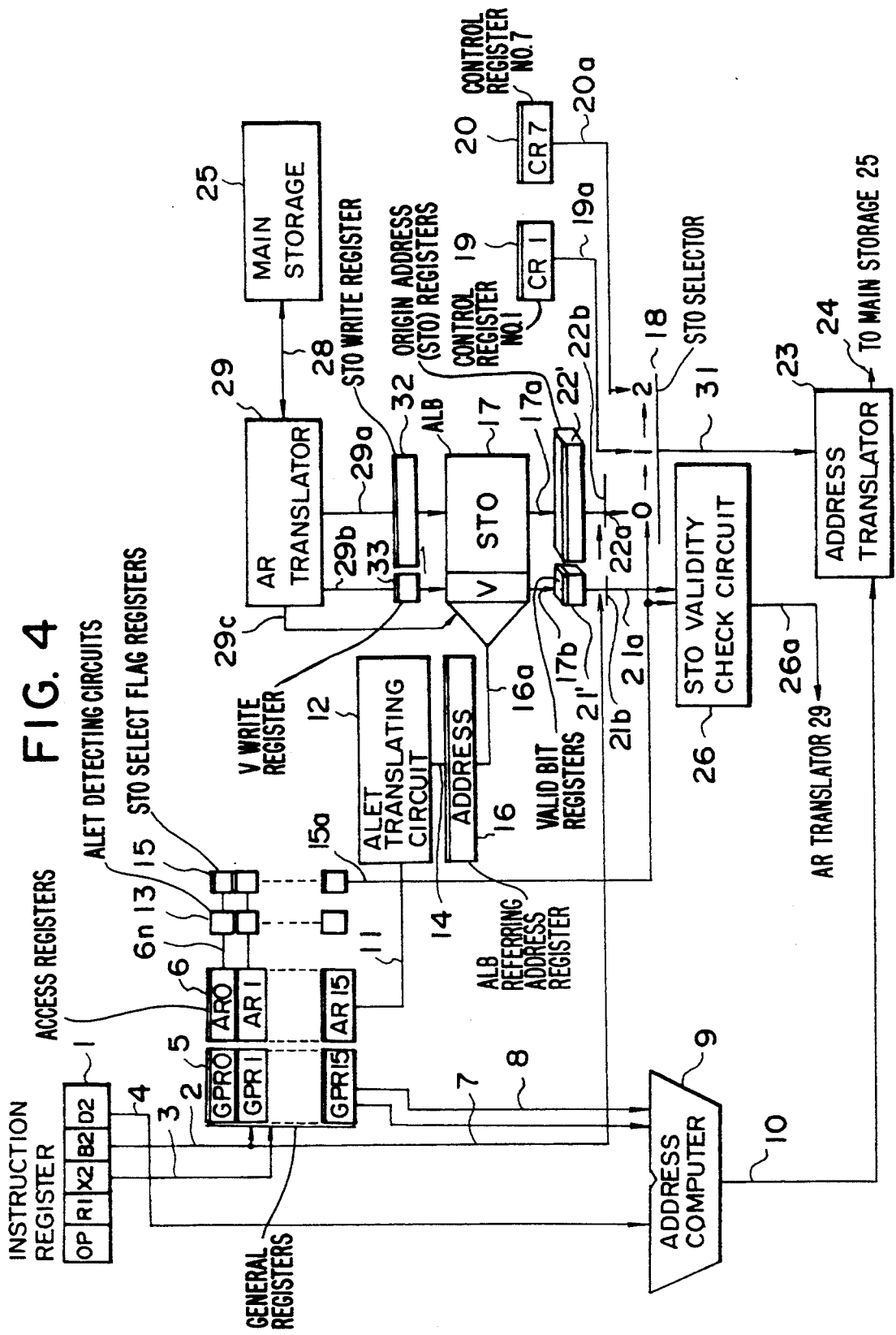
FIG. 4 is a block diagram similar to FIG. 1, showing another embodiment of the invention.

FIG. 4 shows another embodiment of the present invention in which a plurality of valid bit registers 21' and a plurality of STO registers 22' are provided in association with the respective ARs and in which these registers are selected by the signal line 2 which outputs the B2 field of the instruction. Specifically, one STO register is selected from the plurality of STO registers 22' by a selector 22b which is controlled according to the B2 field. The STO in the selected STO register is applied to the STO selector 18. Also, one valid bit register is selected from the plurality of valid bit registers 21' by a selector 21b which is controlled according to the B2 field in order to apply the selected valid bit to validity check circuit 26. Similar to the updating of the STO select flag registers 15 described above, at a time when the ALET in the associated AR has varied, the ALET is read to the signal line 11, and the results of reference to ALB 17 by the ALET are stored in the valid bit register 21' and the STO register 22'.

If an 'L' instruction is stored in the instruction register 1, the corresponding valid bit register 21' and the STO register 22' are selected by the B2 field, namely, the signal line 2, without making reference to the ALB 17 by the ALET in the AR 6 selected by the B2 field. This selection results are outputted respectively to the signal lines 21a, 22a, whereupon the number of accesses the ALB is reduced. If the access time of ALB 17 is relatively long, the arrangement of this embodiment is useful to improve the processing performance.

As mentioned above, according to this invention, in the access register translation to obtain the origin address, the discriminating process as to whether or not an ALET is '0' or '1', which was an overhead conventionally, is omitted before making reference the ALB which stores the translation pairs, thus improving the processing performance.

Further, since the number of accesses to ALB is reduced, it is possible to substantially shorten the ALB access time.

What is claimed is:

1. An apparatus for selecting an origin address for use in translating a logical address for an operand of an instruction in one of a plurality of virtual address spaces to a real address in a real address space, the apparatus comprising:
   at least one control register for storing a predetermined origin address;
   general registers, each of which is capable of being designated as a base register by an instruction;
   access registers for storing respective space identifiers designating respective virtual address spaces, the access registers respectively corresponding to the general registers, wherein the space identifiers stored in the access registers are capable of being changed from time to time;
   means for detecting if the space identifiers stored in the access registers are equal to a predetermined space identifier and outputting respective results of the detecting, the detecting and outputting being repeated for one of the access registers if the space identifier stored in the one access register is changed;
   flag registers for storing the respective results from the detecting means, the flag registers respectively corresponding to the access registers and the general registers;
   means for obtaining an instruction designating one of the general registers as a base register;
   means for performing an access register translation based on a space identifier stored in one of the access registers corresponding to the general register designated as a base register to obtain an origin address; and
   means for selecting one of (1) the predetermined origin address stored in the at least one control register and (2) the origin address obtained by performing the access register translation;
   wherein the selecting means selects the predetermined origin address stored in the at least one control register if a result stored in one of the flag registers corresponding to the general register designated as a base register indicates that the space identifier stored in the access register corresponding to the general register designated as a base register is equal to the predetermined space identifier; and
   wherein the selecting means selects the origin address obtained by performing the access register translation if the result stored in the flag register corresponding to the general register designated as a base register indicates that the space identifier stored in the access register corresponding to the general register designated as a base register is not equal to the predetermined space identifier.

2. The apparatus according to claim 1, wherein the at least one control register includes a first control register for storing a first predetermined origin address and a second control register for storing a second predetermined origin address;
   wherein the selecting means selects the first predetermined origin address stored in the first control register if the result stored in the flag register corresponding to the general register designated as a base register indicates that the space identifier stored in the access register corresponding to the general register designated as a base register is equal to a first predetermined space identifier;
   wherein the selecting means selects the second predetermined origin address stored in the second control register if the result stored in the flag register corresponding to the general register designated as a base register indicates that the space identifier stored in the access register corresponding to the general register designated as a base register is equal to a second predetermined space identifier; and
   wherein the selecting means selects the origin address obtained by performing the access register translation if the result stored in the flag register corresponding to the general register designated as a base register indicates that the space identifier stored in the access register corresponding to the general register designated as a base register is not equal to either the first predetermined space identifier or the second predetermined space identifier.

3. The apparatus according to claim 1, wherein the origin address obtaining means includes
   means for performing the access register translation based on a plurality of space identifiers to obtain a plurality of origin addresses,
   means for storing the plurality of space identifiers and the plurality of origin addresses as a plurality of pairs of space identifiers and origin addresses, and
   means for outputting one origin address of the plurality of origin addresses stored in the storing means based on the space identifier stored in the access register corresponding to the general register designated as a base register;
   wherein the selecting means selects the predetermined origin address stored in the at least one control register if the result stored in the flag register corresponding to the general register designated as a base register indicates that the space identifier stored in the access register corresponding to the general register designated as a base register is equal to the predetermined space identifier; and
   wherein the selecting means selects the one origin address from the outputting means if the result stored in the flag register corresponding to the general register designated as a base register indicates that the space identifier stored in the access register corresponding to the general register designated as a base register is not equal to the predetermined space identifier.

4. The apparatus according to claim 3, wherein the means for outputting one origin address includes
   origin address registers for storing origin addresses from the storing means, the origin address registers respectively corresponding to the access registers, and
   origin address register selecting means for selecting one of the origin address registers based on the instruction designating one of the general registers as a base register;
   wherein the selecting means selects the predetermined origin address stored in the at least one control register if the result stored in the flag register corresponding to the general register designated as a base register indicates that the space identifier stored in the access register corresponding to the general register designated as a base register is equal to the predetermined space identifier; and
   wherein the selecting means selects the origin address stored in the origin address register selected by the origin address register selecting means if the result stored in the flag register corresponding to the general register designated as a base register indicates that the space identifier stored in the access register corresponding to the general register designated as a base register is not equal to the predetermined space identifier.

5. The apparatus according to claim 4, further comprising:

valid data registers for storing data indicative of validities of the origin addresses stored in the origin address registers, the valid data registers respectively corresponding to the origin address registers;

valid data register selecting means for selecting one of the valid data registers corresponding to the origin address register selected by the origin address register selecting means; and means for checking the validity of the origin address stored in the origin address register selected by the origin address register selecting means based on the data stored in the valid data register selected by the valid data register selecting means.

6. The apparatus according to claim 1, wherein the origin address obtaining means includes means for performing the access register translation based on a plurality of space identifiers to obtain a plurality of origin addresses, origin address registers for storing the plurality of origin addresses, the origin address registers respectively corresponding to the access registers, and origin address register selecting means for selecting one of the origin address registers based on the instruction designating one of the general registers as a base register;

wherein the selecting means selects the predetermined origin address stored in the at least one control register if the result stored in the flag register corresponding to the general register designated as a base register indicates that the space identifier stored in the access register corresponding to the general register designated as a base register is equal to the predetermined space identifier; and wherein the selecting means selects the origin address stored in the origin address register selected by the origin address register selecting means if the result stored in the flag register corresponding to the general register designated as a base register indicates that the space identifier stored in the access register corresponding to the general register designated as a base register is not equal to the predetermined space identifier.

7. The method of selecting an origin address for use in translating a logical address for an operand of an instruction in one of a plurality of virtual address spaces to a real address in a real address space, said method comprising the steps of:

storing a predetermined origin address in a control register;

storing space identifiers designating respective virtual address spaces in respective access registers, the access registers respectively corresponding to general registers each of which as capable of being designated as a base register by an instruction, wherein the space identifiers stored in the access registers are capable of being changed from time to time;

detecting if the space identifiers stored in the access registers are equal to a predetermined space identifier, the detecting step being repeated for one of the access registers if the space identifier stored in the one access register is changed;

storing results of the detecting step in respective flag registers, the flag registers respectively corresponding to the access registers and the general registers;

obtaining an instruction designating one of the general registers as a base register;

performing an access register translation based on a space identifier stored in one of the access registers corresponding to the general register designated as a base register to obtain an origin address; and selecting one of (1) the predetermined origin address stored in the control register and (2) the origin address obtained by performing the access register translation;

wherein the predetermined origin address stored in the control register is selected in the selecting step if a result stored in one of the flag registers corresponding to the general register designated as a base register indicates that the space identifier stored in the access register corresponding to the general register designated as a base register is equal to the predetermined space identifier; and wherein the origin address obtained by performing the access register translation is selected in the selecting step if the result stored in the flag register corresponding to the general register designated as a base register indicates that the space identifier stored in the access register corresponding to the general register designated as a base register is not equal to the predetermined space identifier.

8. The method according to claim 7, wherein the step of obtaining an origin address includes the substeps of performing the access register translation based on a plurality of space identifiers to obtain a plurality of origin addresses, and storing the plurality of space identifiers and the plurality of origin addresses as a plurality of pairs of space identifiers and origin addresses;

wherein the predetermined origin address stored in the control register is selected in the selecting step if the result stored in the flag register corresponding to the general register designated as a base register indicates that the space identifier stored in the access register corresponding to the general register designated as a base register is equal to the predetermined space identifier; and wherein one origin address of the plurality of origin addresses is selected from the stored plurality of pairs of space identifiers and origin addresses in the selecting step if the result stored in the flag register corresponding to the general register designated as a base register indicates that the space identifier stored in the access register corresponding to the general register designated as a base register is not equal to the predetermined space identifier and the one origin address is valid.

* * * * *